United States Patent
Rebot

[11] Patent Number: 5,833,009
[45] Date of Patent: Nov. 10, 1998

[54] LAWN EDGER COMPOSED OF A PLURALITY OF PLATES

[76] Inventor: Walter Rebot, 577 Charrington Avenue, Oshawa, Ontario, Canada, L1G 7L7

[21] Appl. No.: 838,231

[22] Filed: Apr. 17, 1997

[51] Int. Cl.[6] .............................. A01D 34/84; A01D 35/00
[52] U.S. Cl. .............................. 172/13; 172/40; 172/377; 172/381; 30/DIG. 5
[58] Field of Search ................ 172/13, 40, 377, 172/371, 381; 30/294, DIG. 5

[56] References Cited

U.S. PATENT DOCUMENTS

| | | | |
|---|---|---|---|
| 962,785 | 6/1910 | Reichert | 172/13 |
| 1,060,445 | 4/1913 | Fields | 172/13 |
| 1,331,750 | 2/1920 | Fulton | 172/13 |
| 1,876,979 | 9/1932 | Larson | 172/13 |
| 2,041,179 | 5/1936 | Higbee | 172/377 X |
| 2,563,031 | 8/1951 | Gordon | 172/13 |
| 2,753,785 | 7/1956 | Zenk | 172/13 |
| 2,787,057 | 4/1957 | Bell | 172/13 X |
| 2,931,444 | 4/1960 | Mills | 172/13 |
| 2,978,041 | 4/1961 | Kramer | 172/40 X |
| 3,029,878 | 4/1962 | McCulley | 172/13 |
| 3,065,801 | 11/1962 | Wood | 172/377 X |
| 3,077,230 | 2/1963 | Guenon | 172/13 |
| 3,751,928 | 8/1973 | Hughes et al. | 172/40 X |
| 3,756,324 | 9/1973 | Bills | 172/40 |
| 3,863,721 | 2/1975 | Scerbo et al. | 172/40 |
| 3,907,040 | 9/1975 | Trusty | 172/40 X |
| 4,351,395 | 9/1982 | Lilley | 172/13 |
| 4,375,836 | 3/1983 | Weichel | 172/40 |
| 4,909,333 | 3/1990 | Lindstrom | 172/40 |
| 5,350,021 | 9/1994 | Walker | 172/377 X |

FOREIGN PATENT DOCUMENTS

| | | | |
|---|---|---|---|
| 580739 | 11/1924 | France | 172/13 |
| 3633757 | 4/1988 | Germany | 172/13 |
| 4671 | 11/1880 | United Kingdom | 172/13 |
| 459612 | 1/1937 | United Kingdom | 172/13 |
| 2178286 | 2/1987 | United Kingdom | 172/13 |

Primary Examiner—Michael J. Carone
Assistant Examiner—Christopher J. Novosad

[57] ABSTRACT

The lawn edger is made up of a number of interconnected flat plates. One plate lies horizontally in use and has a forward cutting edge. A second plate is vertical in use and depends downwardly from one side edge of the horizontal plate. A third plate lies beside the horizontal plate and is disposed at an oblique angle to the vertical plate. That plate has a forward cutting edge. A fourth plate lies adjacent to the rear of the edger. The angle of that plate is such that it directs material which collects on the horizontal plate to move to the side thereof opposite the lateral plate. An electric motor having an eccentric cam bay be mounted on the edger for causing the edger to vibrate or to reciprocate.

14 Claims, 8 Drawing Sheets

LAWN EDGER COMPOSED OF A PLURALITY OF PLATES

BACKGROUND OF THE INVENTION

This invention relates to edgers for lawns and more particularly to edgers having means for removing sod, earth and other material from the edge of a hard flat surface such as a curb or sidewalk and for forming a groove in the ground adjacent to the surface.

Lawn edgers are known which both form a groove beside a curb or sidewalk and scrape the curb or sidewalk. Such edgers are described in a number of U.S. Pat. Nos. including 2,753,785 to Zenk; 962,785 to Reichert; U.S. Pat. No. 1,876,979 to Larson; and U.S. Pat. No. 4,351,395 to Lilley.

Lawn edgers such as those described in the patents referred to above have a number of shortcomings. Material such as earth and sod which comes from the groove cut by the edger tends to clog the cutting edges of the edger. The material also tends to accumulate on the edger and to increase its weight. The longer the edger is used the heavier and more unwieldy it becomes.

Another shortcoming of many known edgers is their relatively high cost of production. Such edgers include a curved blade or plough for moving the material cut by the edger. Generally, curved components such as blades or ploughs are more expensive to manufacture than components that are flat.

The lawn edger of the subject invention does not share the shortcomings mentioned above. The edger is designed so that material which collects on it is pushed off the edger by new material which is collected on the edger as it advances. In addition according to one embodiment of the subject edger, the edger is made up of plates having planar surfaces. The edger lacks the curved blades or ploughs found on many conventional edgers.

The subject edger may optionally have means for vibrating it or for causing it to reciprocate in order to encourage the movement of material which collects on it to the side of the edger where it may be easily removed.

The lawn edger of the subject invention according to one its aspects may be broadly described as including a plurality of interconnected plates each having oppositely facing planar surfaces, a first plate lying horizontally in use and having a forward cutting edge and oppositely facing side edges, a second plate being vertical in use and depending downwardly from one side edge, a third plate lying lateral of the horizontal plate and being disposed at an oblique angle to the vertical plate, the lateral plate having a lower edge connected thereto and having a forward cutting edge and a rear plate adjacent to the rear of the edger, the rear plate extending upwardly and at an angle to direct material collected on the horizontal plate to move to the side thereof opposite the lateral plate.

DESCRIPTION OF THE DRAWINGS

The lawn edger of the invention is described with reference to the accompanying drawings in which.

Like reference characters refer to like parts throughout the description of the drawings.

DESCRIPTION OF PREFERRED EMBODIMENTS

Figure 1:
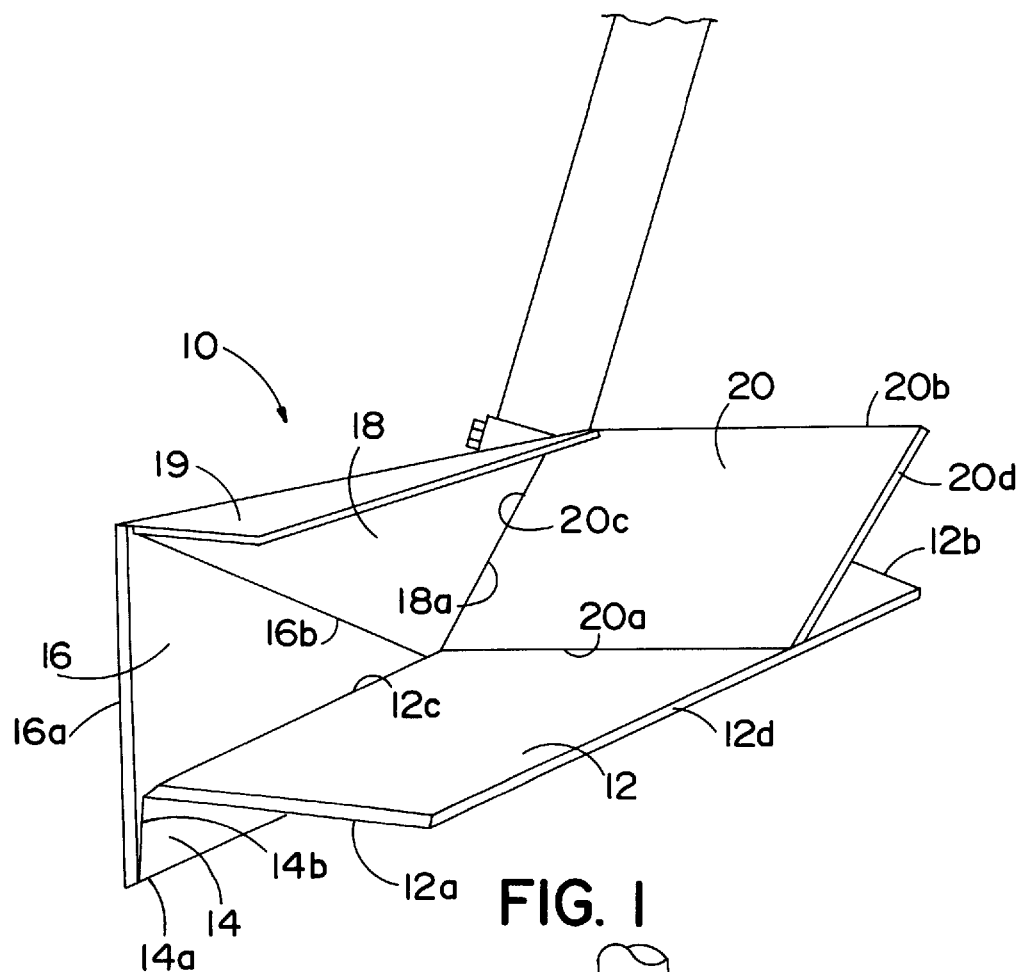
FIG. 1 is a perspective view of a first embodiment of the edger from the front.
Figure 2:
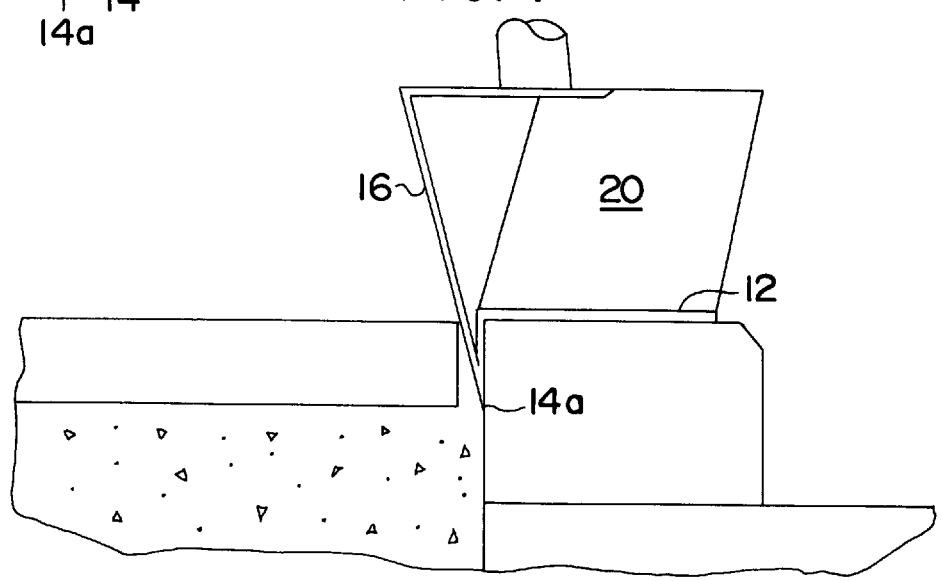
FIG. 2 is an elevation of the front of the edger.

With reference to FIGS. 1 and 2 the edger of the invention, indicated generally 10, includes a first plate 12 which is intended to be pushed along a flat surface of asphalt, concrete and the like. Since the plate will generally be horizontal when it is used for that purpose it will be referred to as the "horizontal plate" in the description which follows. It will be understood however that the plate will not always be horizontal in use and it is not intended that the use of the term "horizontal" restrict its use in any manner.

Horizontal plate 12 has forward and rear edges 12a,b and side edges 12c,d.

A second plate 14 is disposed normal to the horizontal plate and depends downwardly from its edge 12c. For the sake of simplicity the second plate will be referred to as the "vertical plate" but that term is not intended to restrict its use in any manner.

The vertical plate terminates at a lower edge 14a and is joined along that edge to the lower edge of a third plate 16. The latter plate lies laterally of the horizontal plate and extends upwardly from its lower edge at an oblique or acute angle to the vertical plate. The rear edge 16b is connected to a fourth or intermediate plate 18. An upper plate 19 is attached to the upper edge of the intermediate plate 18.

As illustrated, the forward edge 16a of the lateral plate is spaced apart from the side edge 12c of the horizontal plate. To the rear, the lateral plate approaches the horizontal plate and contacts it at its rear edge 16b.

A fifth plate 20 is disposed at the rear of the edger. That plate, referred to as the "rear plate" extends upwardly and toward the rear from the horizontal plate. The angle between the rear plate and the horizontal plate is oblique or acute as is illustrated. The lower edge 20a of the rear plate is in contact with the horizontal plate while its upper edge 20b is spaced above it.

A side edge 20c of the rear plate abuts the rear edge 18a of the intermediate plate. The rear plate extends at an oblique or obtuse angle relative to the intermediate plate so that its other side edge 20d is spaced apart from the forward edge 12a of the horizontal plate further than the distance between edge 20c and forward edge 12a. Such distances are measured along edges 12c and 12d. The rear plate thus directs any sod, earth or other material which collects on the horizontal plate toward the side opposite that of the lateral and intermediate plates.

Figure 5:
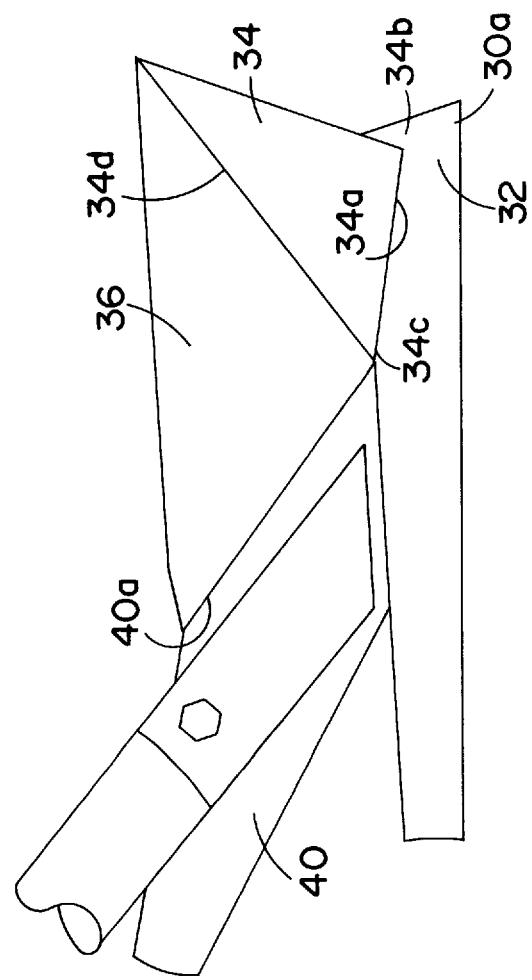
FIG. 5 is an elevation of the edger from the side opposite that illustrated in FIG. 4.
Figure 6:
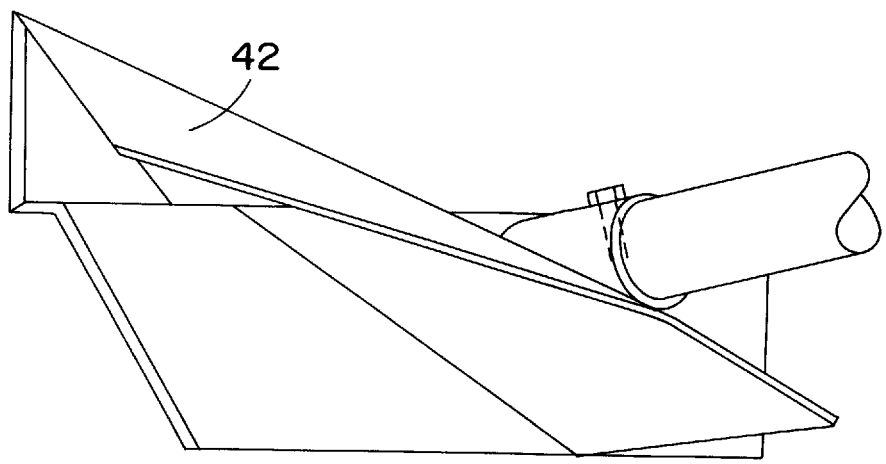
FIG. 6 is a plan view of the edger illustrated in FIGS. 3–5.

With reference to FIGS. 3–6, the illustrated edger has horizontal and vertical plates 30, 32 of the same construction as the edger illustrated in FIGS. 1 and 2. As illustrated in FIG. 5, the lower edge 34a of lateral plate 34 is connected to the vertical plate 32 along its length and its forward-most point 34b is above the edge 30a. By contrast the forward-most point of plate 16 in FIG. 1 is adjacent to the lower edge 14a of the vertical plate.

The rearward-most point 34c of edge 34a is adjacent to the upper surface of the horizontal plate.

The lateral plate is disposed at an oblique angle relative to the vertical plate and is connected to the intermediate plate 36 along its rear edge 34d. The intermediate plate extends from the lateral plate and terminates at the edge 40a of rear plate 40. An upper plate 42 is seated on the upper edge of the intermediate plate.

Figure 3:
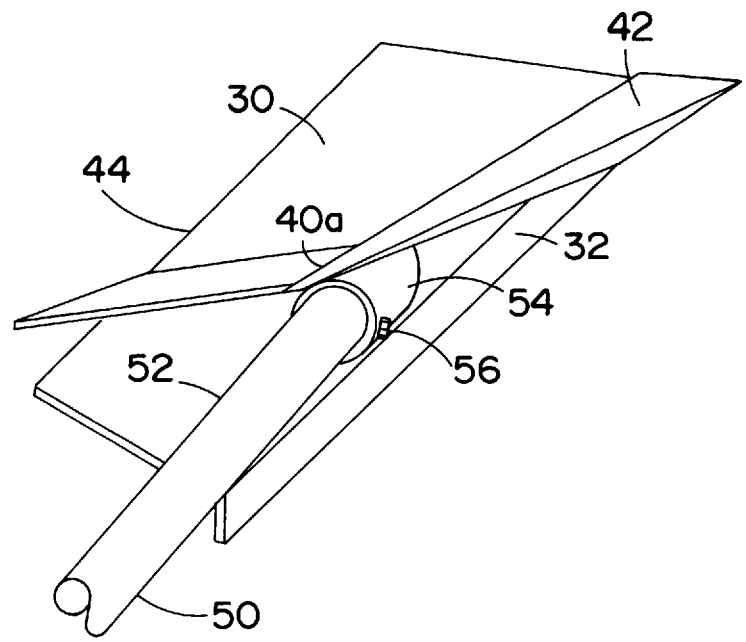
FIG. 3 is a perspective view of a second embodiment of the edger from the rear.
Figure 4:
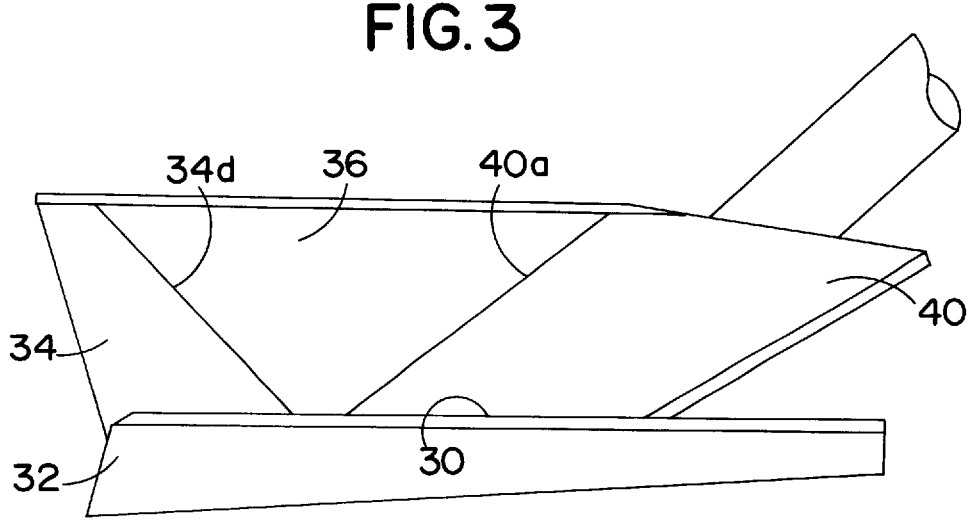
FIG. 4 is an elevation of the edger illustrated in FIG. 3 from the side.

Rear plate 40 is of the same construction as plate 20 illustrated in FIGS. 1 and 2. As illustrated in FIG. 3, the rear plate extends toward the rear from its side edge 40a so that material which accumulates on the horizontal plate is pushed to side 44 of the plate by fresh material at the front of the edger.

A handle 50 extends upwardly from the rear of the edger. The handle is composed of a tube 52 and a sleeve 54. The sleeve has a lower edge which is attached to the horizontal plate by suitable means such as by welding. The tube is secured in the sleeve by means of a bolt 56.

With reference again to FIGS. 1 and 2, the forward edge 12a of the horizontal plate as well as the forward edges 14b, 16a of the vertical and lateral plates are sharpened for cutting sod and for separating hardened earth from the flat hard upper surface of asphalt, concrete over which the edger passes. All three forward edges 12a, 14b and 16a lie in the same imaginary plane.

The forward edges of the horizontal, vertical and lateral plates of the edger illustrated in FIGS. 3–6 are sharpened but they do not lie in the same imaginary plane.

Figure 7:
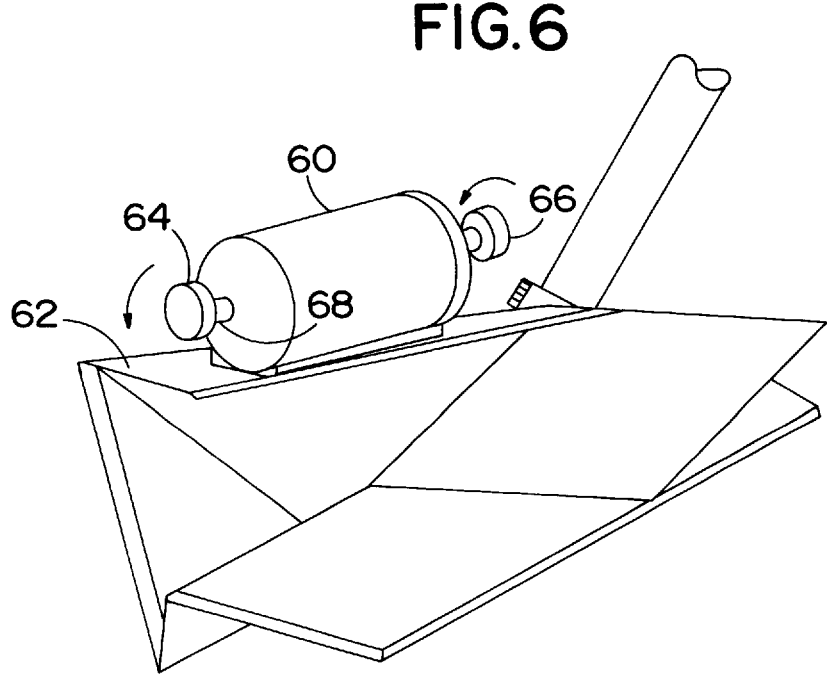
FIG. 7 is a perspective view of the edger illustrated in FIGS. 3–6 in combination with an agitator.

With reference to FIG. 7, an electric motor 60 is mounted on upper plate 62. Cams 64, 66 are mounted eccentrically on an axle 68 of the motor. As the axle rotates, the cams cause the motor to vibrate and that vibration is communicated to the edger. The vibrations will serve to dislodge earth, grass and any other material caught between the vertical and lateral plates. The vibrations will also keep material which accumulates on the horizontal plate in motion. That material will be pushed to the rear by fresh material which collects on the edger as it advances and when that material contacts the rear plate it will be directed to the side and off the edger.

Figure 8:
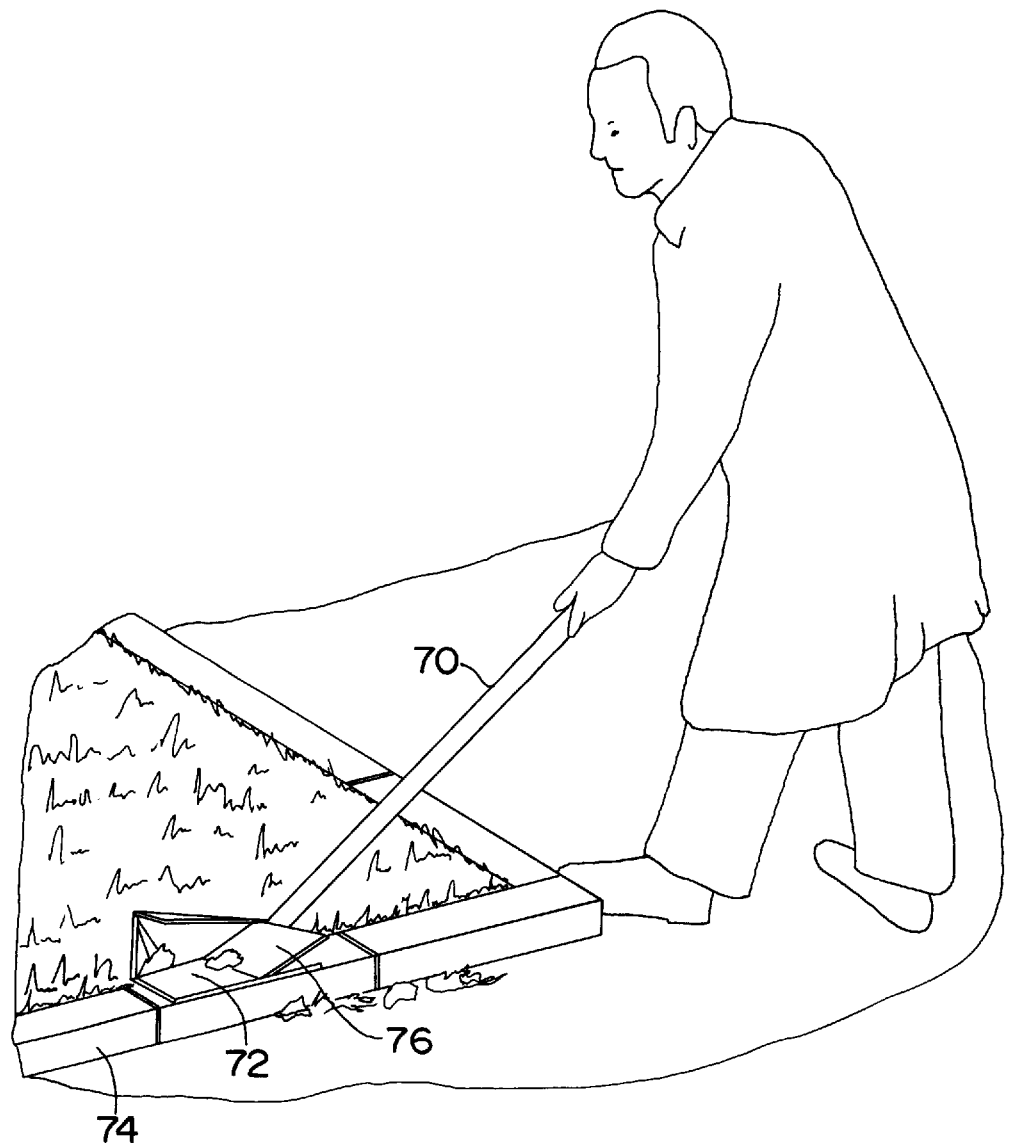
FIG. 8 is a perspective view of the edger in use.

With reference to FIG. 8, the edger is shown being held by handle 70 and the horizontal plate 72 rests on the upper surface of a row of bricks 74. The vertical and lateral plates of the edger extend downwardly from the inside edge of the bricks to cut the sod and earth in contact with the bricks.

As the edger is pushed forward, the sod and earth that is cut accumulate on the horizontal plate. The material that is freshly cut pushes the material that is already on the plate to the rear and when the material contacts the rear plate 76 it moves to the side of the edger opposite the vertical and lateral plates and onto the ground.

Figure 9:
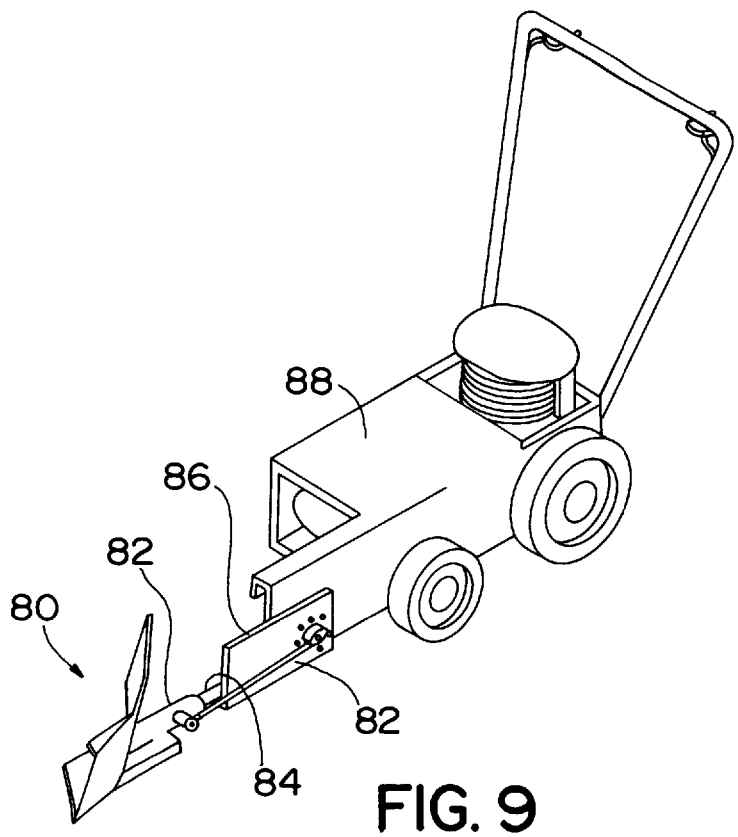
FIG. 9 in a perspective view of the edger in combination with a vehicle for propelling it forward.
Figure 10:
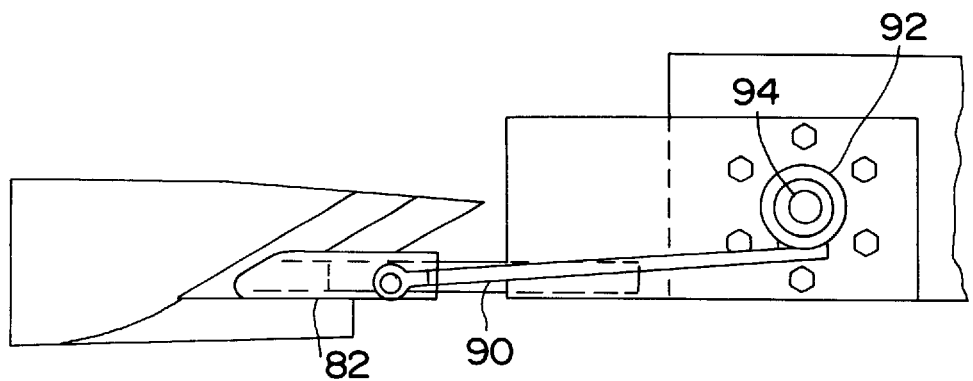
FIG. 10 is a elevation, in enlarged scale, of the edger and a portion of the vehicle illustrated in FIG. 9.

With reference to FIGS. 9 and 10, edger 80 is mounted to a hollow tube 82 in which a rod 84 is slidingly received. The rod is fixed to plate 86 which is bolted to the forward end of a motorized vehicle 88. A second rod 90 is mounted to a sleeve 92 which is caused to reciprocate by means of a spindle 94 which is rotated by the vehicle. The means by which rotary motion of the bar is converted into reciprocating motion is conventional.

Rod 90 is connected to the outer wall of tube 82 and as the rod reciprocates, the edger moves forward and backward. Such movement facilitates cutting of sod or earth beside the sidewalk or curb over which the edger moves. The movement also encourages material on the edger to move to the side and off the edger.

Figure 11:
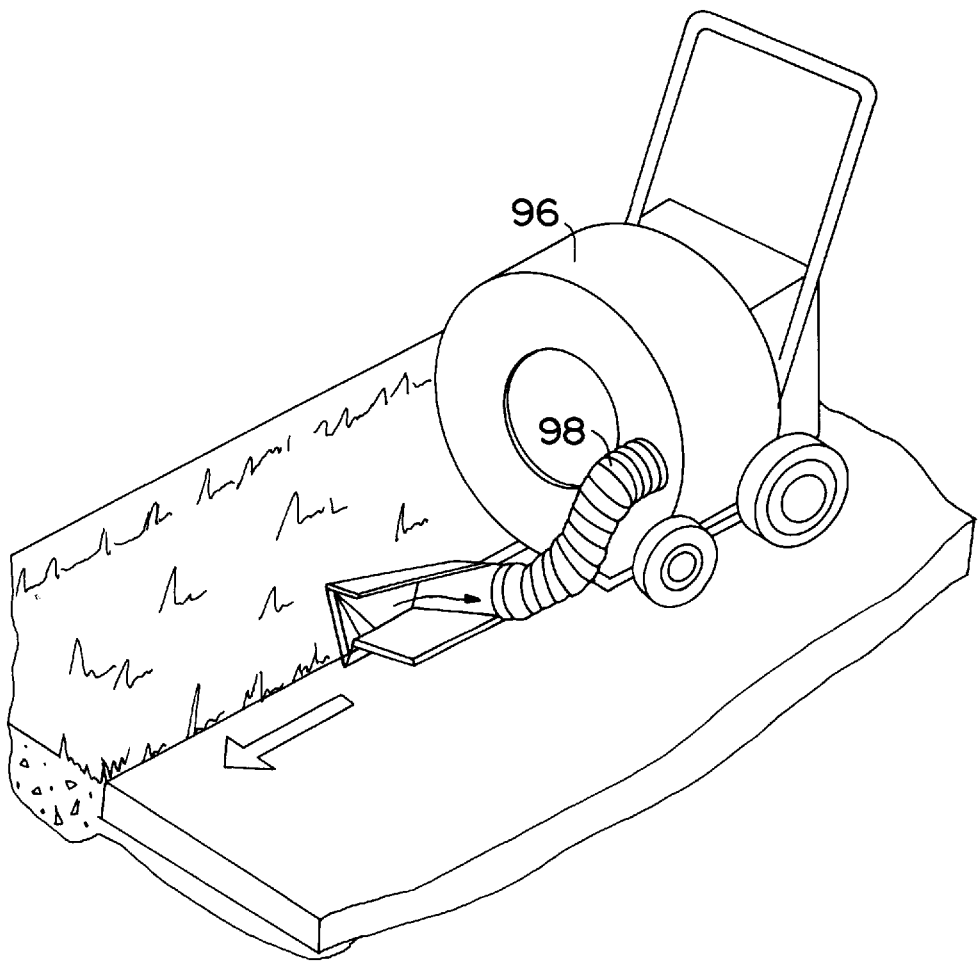
FIG. 11 is a perspective view of the edger in combination with a vehicle for propelling it forward and for removing the sod, earth and other material removed by the edger.

In FIG. 11, the vehicle is equipped with a fan (not illustrated) enclosed in a housing 96 and a hose 98 runs from the rear of the edger to the housing for removing material which accumulates on the edger.

Figure 12:
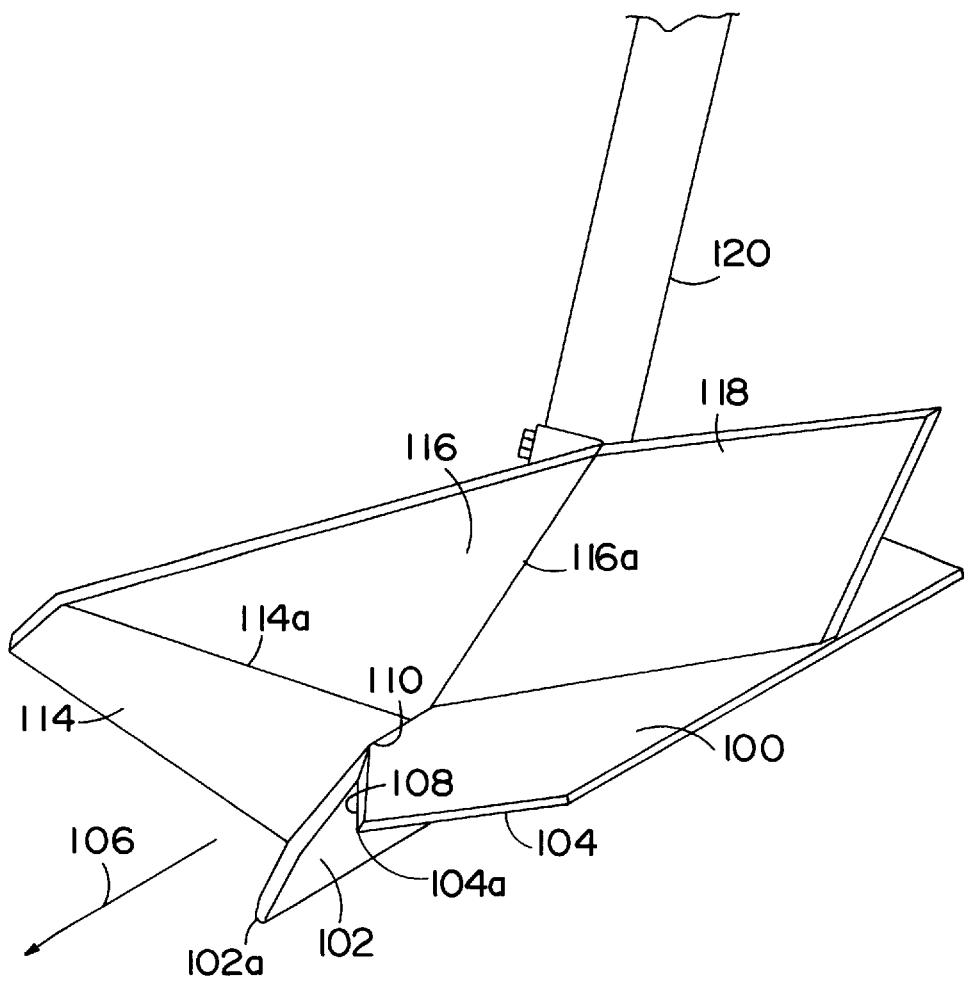
FIG. 12 is a perspective view of a third embodiment of the edger from the front.

In FIG. 12 the illustrated edger has horizontal and vertical plates 100, 102. The cutting edge 104 of the horizontal plate is oriented at an oblique angle relative to the forward movement of travel of the edger when the edger is used in an edging mode. The direction of that movement is indicated by arrow 106. The forward-most point 104a of that edge merges with the side edge 108 of the plate and the latter edge is sharpened by means of bevelling.

Side edge 108 extends to the rear and terminates at a second point 110. The forward edge of the vertical plate extends downwardly from point 110 in the direction of arrow 106 and terminates at a point 102a.

The lower edge of a third plate 114 which is connected to plate 102. The third plate extends upwardly at an oblique or acute angle to the vertical plate and its rear edge 114a is connected to a fourth or intermediate plate 116. The rear edge 116a of the latter plate is connected to rear plate 118. Rear plate 118 is of the same construction as plate 40 in FIG. 4.

Handle 120 is pivotally connected by conventional means to the horizontal plate at the same point as handle 50 is connected to plate 30 in FIG. 3. By means of the pivotal connection the operator of the edger may adjust the angle of the handle so that he may remain upright when he is using the edger whatever his height may be.

It will be understood of course that modifications can be made in the preferred embodiments illustrated and described herein without departing from the scope and purview of the invention as defined in the appended claims.

I claim:

1. A lawn edger comprising:

a plurality of interconnected plates each having oppositely facing planar surfaces, a first said plate lying horizontally in use and having a forward cutting edge and oppositely facing side edges, a second said plate being vertical in use and depending downwardly from one said side edge, a third said plate lying lateral of the horizontal plate and being disposed at an oblique angle to said vertical plate, the lateral plate having a lower edge (connected thereto) and (having) a forward cutting edge and a rear edge to which a forward edge of an intermediate said plate is connected, said intermediate plate being oriented at an oblique angle relative to the lateral plate and having a rear edge which is connected to a side edge of a rear said plate, said rear plate being disposed at an oblique angle to the horizontal plate and having a lower edge connected thereto, said rear plate extending upwardly and toward the rear from said horizontal plate.

2. The lawn edger as claimed in claim 1 wherein said horizontal, vertical and lateral plates each have a cutting edge at the forward limit of each, said cutting edges all lying in the same plane.

3. The lawn edger as claimed in claim 1 wherein said rear plate is disposed at an oblique angle to said intermediate plate and extends to the rear from its said side edge.

4. The lawn edger as claimed in claim 1 further including means for causing said edger to vibrate.

5. The lawn edger as claimed in claim 1 further including means for causing said edger to reciprocate.

6. The lawn edger as claimed in claim 1 further including;

an upper plate having a side edge connected to an upper edge of said intermediate plate, said upper plate being generally parallel to said horizontal plate, and means mounted to said upper plate for causing the lawn edger to vibrate.

7. The lawn edger as claimed in claim 1 wherein said vertical plate has a forward cutting edge which lies in the same imaginary plane as the cutting edge of said horizontal plate.

8. The lawn edger as claimed in claim 1 wherein said vertical plate has a forward cutting edge which lies in the same imaginary plane as the cutting edge of said horizontal plate, the cutting edge of said lateral plate being out of said imaginary plane and commencing at the lower edge of said lateral plate at a point to the rear of said imaginary plane and extending upwardly toward and through said plane and terminating at a point forward of said plane.

9. The lawn edger as claimed in claim 1 wherein said cutting edge of said horizontal plate is oriented at an oblique angle relative to the forward movement of travel of said edger when used in an edging mode and has, at one side thereof, a forward-most point, one of said side edges being sharpened and commencing at said forward-most point and terminating at a second point to the rear thereof, said vertical plate having a forward edge which commences at said second point and extends downwardly in the direction of said forward movement of travel.

10. The lawn edger as claimed in claim 1 wherein said cutting edge of said horizontal plate is oriented at an oblique angle relative to the forward movement of travel of said edger when used in an edging mode and has, at one side thereof, a forward-most point, one of said side edges being sharpened and commencing at said forward-most point and terminating at a second point to the rear thereof, said vertical plate having a forward edge which commences at said second point and extends downwardly in the direction of said forward movement of travel and terminates at a point.

11. The lawn edger as claimed in claim 10 further including a handle pivotally mounted to one of said plates.

12. The lawn edger as claimed in claim 11 further including a handle pivotally mounted to said first plate.

13. A lawn edger comprising:

a plurality of interconnected plates each having oppositely facing planar surfaces, a first said plate lying horizontally in use and having a forward cutting edge and oppositely facing side edges, said cutting edge being oriented at an oblique angle relative to the forward movement of travel of said edger when used in an edging mode and having at one side thereof a forward-most point, one of said side edges being sharpened and commencing at said forward-most point and terminating at a second point to the rear thereof, a second said plate being vertical in use and depending downwardly from said one side edge, said second plate having a forward edge which commences at said second point and extends downward and forward in the direction of said forward movement of travel, a third said plate lying lateral of the horizontal plate and being disposed at an oblique angle to said vertical plate, said lateral plate having a lower edge connected to said vertical plate and having a forward cutting edge, and a rear edge to which a forward edge of an intermediate said plate is connected, said intermediate plate being oriented at an oblique angle relative to the lateral plate and having a rear edge which is connected to a side edge of a rear said plate, said rear plate lying to the rear of said forward cutting edge and extending upwardly at such an angle that it directs material on said horizontal plate to move to the side thereof opposite said lateral plate.

14. The lawn edger as claimed in claim 13 further including a handle pivotally mounted to said first plate.

\* \* \* \* \*